United States Patent [19]

Nameki

[11] Patent Number: 5,526,137
[45] Date of Patent: Jun. 11, 1996

[54] IMAGE PROCESSING SYSTEM AND DIAGNOSING METHOD THEREOF

[75] Inventor: Yu Nameki, Kanagawa, Japan

[73] Assignee: Fuji Xerox Co., Ltd., Tokyo, Japan

[21] Appl. No.: 178,799

[22] Filed: Jan. 7, 1994

[30] Foreign Application Priority Data

Jan. 11, 1993 [JP] Japan .................................. 5-002890

[51] Int. Cl.⁶ ............................... H04N 1/00; H04N 1/40
[52] U.S. Cl. ........................... 358/406; 358/426; 358/444
[58] Field of Search ..................................... 358/406, 448, 358/426, 504, 403, 404, 444; 382/47; 371/60.4, 22.4, 15.1, 25.1

[56] References Cited

U.S. PATENT DOCUMENTS

| | | | |
|---|---|---|---|
| 5,157,782 | 10/1992 | Tuttle et al. | 371/22.4 |
| 5,175,633 | 12/1992 | Saito et al. | 358/406 |
| 5,301,036 | 4/1994 | Barret et al. | 358/448 |

FOREIGN PATENT DOCUMENTS

| | | | |
|---|---|---|---|
| 61-289765 | 12/1986 | Japan | H04N 1/411 |
| 63-174473 | 7/1988 | Japan | H04N 1/41 |
| 3-265959 | 11/1991 | Japan | G06F 13/12 |

*Primary Examiner*—Edward L. Coles, Sr.
*Assistant Examiner*—Fan Lee
*Attorney, Agent, or Firm*—Finnegan, Henderson, Farabow, Garrett & Dunner

[57] ABSTRACT

A method of diagnosing an image processing system. In the method, predetermined diagnosis data of a compressed form is stored into a first page of a page buffer capable of storing image data of at least two pages. The diagnosis data of the compressed form read out of a memory area of the first page is expanded into restored diagnosis image data. The restored diagnosis image data is stored into a second page of the page buffer. The restored diagnosis image data is subjected to rotation processing by a rotation processor and the processed diagnosis image data is stored into the memory area of the first page. The processed diagnosis image data read out of the first page memory area is compressed by a compressor and the compressed image data is stored into the second page memory area. The result of the rotation processing is diagnosed by comparing the diagnosis data of the compressed form read out of the second page memory area with test data of the compressed form that is previously prepared.

7 Claims, 3 Drawing Sheets

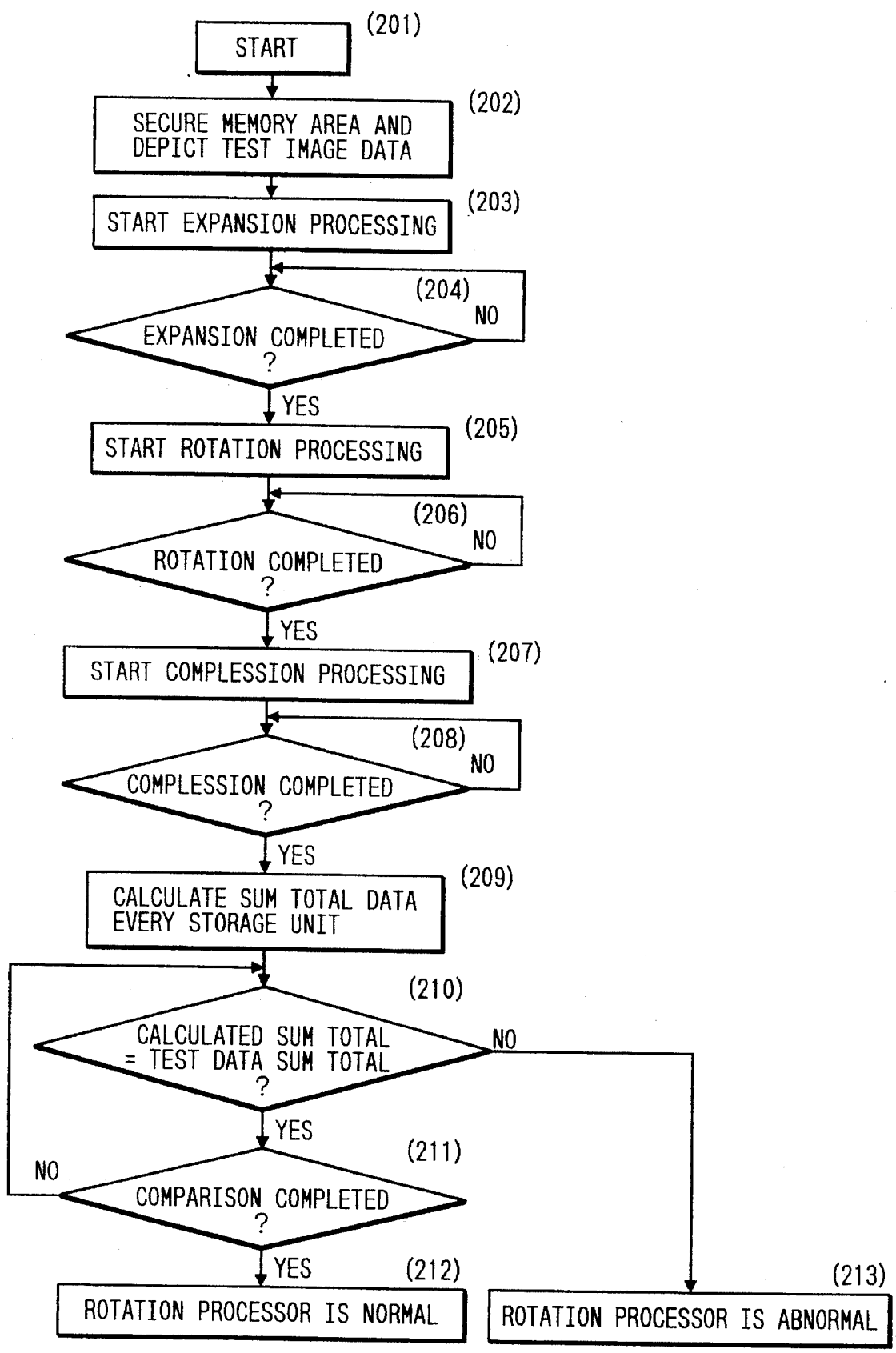

IMAGE PROCESSING SYSTEM AND DIAGNOSING METHOD THEREOF

BACKGROUND OF THE INVENTION

1. Field of the Invention

The present invention relates to an image processing system used for a digital copying machine and a facsimile machine. More particularly, the invention relates to an image processing system with a self-diagnosis function for the processing of image data, and a method of diagnosing the image processing system.

2. Discussion of the Related Art

With the spread of personal computers and word processors, image data to be processed for copying purposes, for example, takes various forms and increases its amount in office work. In the copying machines, a further improvement of reproduced image quality is required. In addition to such simple functions as the function of producing a predetermined number of copies of an image on an original document, and the enlargement/reduction function, further complicated functions are required, such as the function to automatically rotate input image data as to be laid out in the best mode on a selected sheet of paper, the function to process the image data of an original as instructed by an operator, the function to rearrange a plurality of original documents on a single sheet of paper, and the function to output a plurality of the images of original documents in the order indicated by an operator, that is different from the order of inputting the original documents.

An example of the copying machine with a multiple of functions is the following digital copying machine. In the copying machine, an original document or documents are set on an automatic document feeder (ADF). The ADF automatically transports documents to a platen of the machine. An image input terminal (IIT) optically reads an image on the original and converts it into digital image signals, and sends the digital image signals to an image processor. The image processor processes the image data signals, or the digital image signals in various ways, compresses the processed image data, and stores the compressed image data in a memory. To output the stored image data, the machine reads the image data out of the memory, expands the image data, and transfers the expanded image data to an image output terminal (IOT). The IOT prints the image data on a sheet or sheets of paper.

To realize the functions as mentioned above, the image processing system, or the digital copying machine, is provided with various types of functions, such as enlargement, reduction, composition, erasing, movement, copying, paintout, and resolution change. Particularly the recent machine is capable of rotating the input image data.

The image rotation technique is well known. Japanese Patent Unexamined Publication No. Hei. 3-265959 proposes inventive image processing means capable of rotating image data expressed by tone data of 4 bits per pixel.

The conventional image processing system has the following serious problems. An error, which is caused during the image processing, is found after the processed image data is visualized, that is, it is displayed or printed. When the error is found, the input image data before it is processed has frequently disappeared in the machine. To find the location where the error is caused, the image data must be input again. This greatly influences the machine productivity. Even if such image data is present, it is impossible to find the trouble-caused location in the machine. Accordingly, the possibility of error recurrence still exists in the machine.

The technique enabling the machine itself to check whether or not the compressing and expanding process of image data is normal is disclosed in Japanese Patent Unexamined Publication No. Sho. 63-174473. In this technique, reference data for test is previously prepared. To check, specific image data is compressed and the compressed data is compared with the reference data as the previously compressed specific data. If both pieces of the data are coincident with each other, the machine decides that the compressing operation of the machine is normal.

The self-diagnosis technique disclosed in the above publication, which is based on the result of comparing the compressed specific data and the reference data, is simple and reliable. However, this technique is not practical. The reason will be described hereinafter. Let us consider a case where the maximum image size that can be processed is A4, the tone data of 4 bits per pixel, and the image density is 400 pixels per inch, i.e., 400 dpi (dots per inch). The data quantity of each of the specific data and the reference data amounts to 8 Mega bytes. The self-diagnosis technique, when incorporated into the machine, brings about increase of machine cost, and takes much time for the compression process of the specific data and the comparison process of the compressed specific data with the reference data.

SUMMARY OF THE INVENTION

The present invention has been made in view of the above circumstances and has an object to provide an image processing system which can efficiently diagnose by itself a state of the image data compressing/expanding function in an inexpensive manner.

Another object of the present invention is to provide a method of diagnosing a state of the image data compressing/expanding function of an image processing system capable of compressing and expanding image data.

To achieve the above object, the invention provides an image processing system including storing means for storing image data or compressed data; compressing means for compressing the image data stored in the storing means and storing the compressed image data into the storing means; expanding means for expanding the compressed image data stored in the storing means and storing the expanded image data into the storing means; image processing means for processing the image data stored in the storing means and storing the processed image data into the storing means; diagnosis data storing means for storing predetermined diagnosis data in a compressed form; developing means for reading out the diagnosis data from the diagnosis data storing means and developing the readout diagnosis data into the storing means; test data storing means for storing test data formed by previously processing the diagnosis data, in a compressed form; and comparing means for comparing the test data from the test data storing means with the compressed data from the storing means in a state that both the data are in the compressed form, wherein the diagnosis data of the compressed form that is developed into the storing means is restored to its original form by the expanding means, the restored data is processed by the image processing means, the processed data is compressed by the compressing means, and the compressed data is compared with the test data by the comparing means in the state that both the data are in the compressed form.

Further, the invention provides an image processing system including storing means for storing image data or compressed data; compressing means for compressing the image data stored in the storing means and storing the compressed image data into the storing means; expanding means for expanding the compressed image data stored in the storing means and storing the expanded image data into the storing means; image processing means for processing the image data stored in the storing means and storing the processed image data into the storing means; diagnosis data storing means for storing predetermined diagnosis data in a compressed form; developing means for reading out the diagnosis data from the diagnosis data storing means and developing the readout diagnosis data into the storing means; sum total calculating means for reading the image data or compressed data from the storing means in the form of numerical values every storage unit and for summing the readout data of numerical values; sum total data storing means for storing, every storage unit of the storing means, the sum total of test data that is formed by previously summing the numerical values of the test data as the compressed and processed diagnosis data; and comparing means for comparing the sum total data read out of the sum total data storing means with the sum of the data calculated by the sum total calculating means, wherein the diagnosis data of the compressed form that is developed into the storing means by the developing means is restored to its original form by the expanding means, the restored data is processed by the image processing means, the processed data is compressed by the compressing means, and the sum total of the compressed data output from the compressing means is calculated by the sum total calculating means, and the sum total thus obtained is compared with the sum total data read out of the sum total data storing means by the comparing means, whereby diagnosing the operation of the image processing means.

Furthermore, the invention provides a method of diagnosing an image processing system including the steps of storing predetermined diagnosis data of a compressed form into a first page of storing means capable of storing image data of at least two pages; expanding the diagnosis data of the compressed form read out of a memory area of the first page into restored diagnosis image data, and storing the diagnosis image data into a second page of the storing means; processing the restored diagnosis image data and storing the processed diagnosis image data into the memory area of the first page of the storing means; compressing the processed diagnosis image data read out of the first page memory area and storing the compressed diagnosis image data into the second page memory area; and diagnosing the result of processing the image data by comparing the diagnosis data of the compressed form read out of the second page memory area with test data of the compressed form that is previously prepared.

BRIEF DESCRIPTION OF THE DRAWINGS

The accompanying drawings, which are incorporated in and constitute a part of this specification, illustrate an embodiment of the invention and, together with the description, serve to explain the objects, advantages and principles of the invention. In the drawings.

FIG. 3 is a flow chart showing another self-diagnosis operation of the image processing system.

DETAILED DESCRIPTION OF THE PREFERRED EMBODIMENTS

The preferred embodiments of the present invention will be described with reference to the accompanying drawings.

Figure 1:
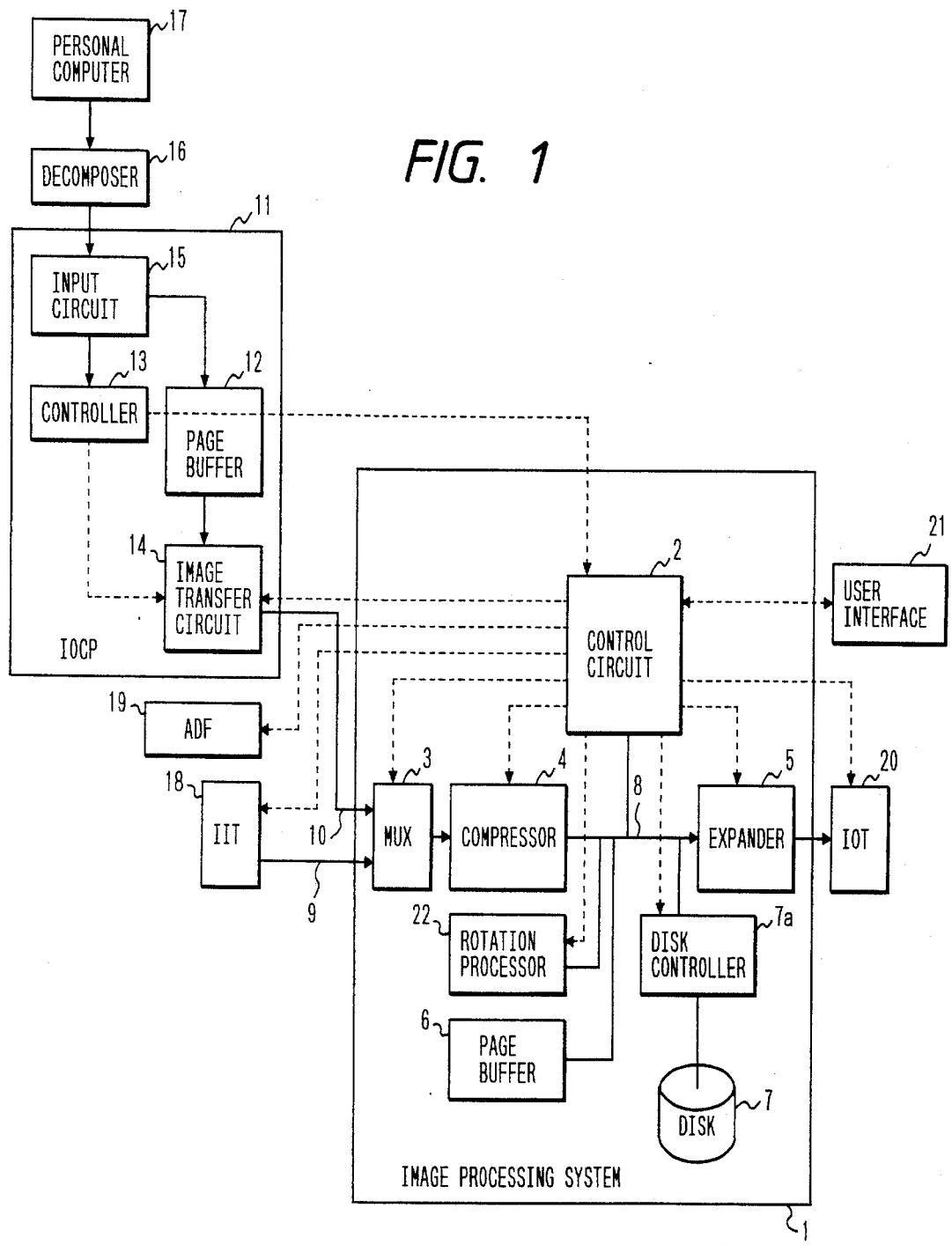
FIG. 1 is a block diagram showing a multifunctional image recording system incorporating an image processing system according to the present invention.
Figure 2:
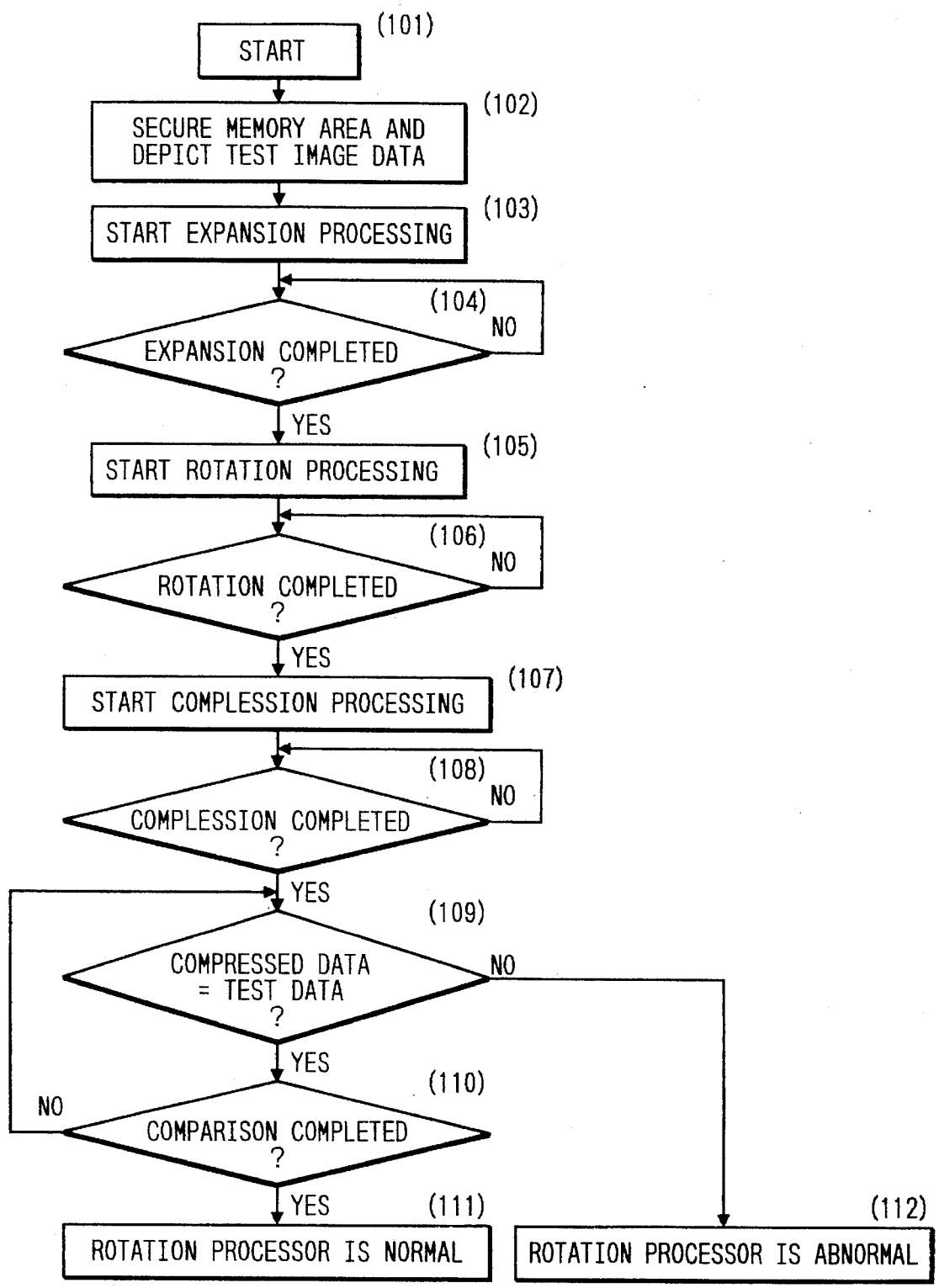
FIG. 2 is a flow chart showing a self-diagnosis operation of the image processing system.

A multifunctional image recording system incorporating an image processing system according to the present invention is shown in block form in FIG. 1. A flow chart showing a self-diagnosis operation of the image processing system of FIG. 1 when it carries out a process of image rotation, is shown in FIG. 2.

In FIG. 1, an image processing system 1 includes a multiplexer 3 for selecting image data from an image reader or image data from an external device, such as a personal computer or a facsimile, a compressor 4 for compressing image data, an expander 5 for expanding the compressed data into original image data, a page buffer 6, a disk 7 as a data memory of a large memory capacity, a rotation processor 22 for carrying out a process of image rotation, and a control circuit 2 including a nonvolatile memory, which stores control history data.

An image input terminal (IIT) 18 includes an image reader for reading an image on an original document by means of a CCD (charge coupled device) sensor, for example. The IIT 18 carries out the adjustments of offset and gain, converts analog image signals into digital image data signals, and carries out gap and shading correction operations. When it reads the document image in a color mode, it separates an image on the original document into three primary colors R (red), G (green), and B (black), and picks up the image data of R, G and B and variously processes the image data. Those processings are END (equivalent neutral density) conversion, color masking, document size detection, color change, UCR (under color removal), black generation, mesh-dot removal, edge emphasis, TRC (tone reduction control), enlargement/reduction, edits, and the like. An ADF (automatic document feeder) 19, attached to the IIT 18, automatically feeds original documents in the image recording system.

An image output terminal (IOT) 20 is a laser printer for reproducing an half-tone image of mesh-dots by controlling the on/off of a laser beam every pixel in accordance with two level data generated from the image data.

A personal computer 17 is a general personal computer. A decomposer 16 decomposes code data from the personal computer 17 into bit maps.

An IOCP (input/output coprocessor) 11 includes an input circuit 15 for receiving the image data from the personal computer, a page buffer 12, an image transfer circuit 14, and a controller 13. The IOCP 11 appropriately divides the image data of the page buffer 12 and transfers the divided pieces of data to the subsequent stage.

A user interface 21, including a display, a control panel, and the like, is used for entering instructions of various types of functions and edits, and displaying the contents of the instructions.

Next, the circuit blocks forming the image processing system 1 will be described.

The multiplexer 3 selectively connects the input bus connecting to an image bus 8 to an image bus 9 derived from the IIT 18 or an image bus 10 derived from the IOCP The compressor 4 operates in two modes, a compression mode and a through mode. In the compression mode, the compressor 4 compresses data by an adaptive prediction coding system. In the adaptive prediction coding system, for example, a plurality of predictors simultaneously predict every 8 pixels of the image data, and the predictor of the highest prediction rate is used for the next 8-pixel prediction. In this case, the pixel of which the prediction is true is expressed by "0", and the pixel of which the prediction is false, by "1".

The expander 5 operates in two modes, an expansion mode and a through mode. In the expansion mode, the expander 5 expands the compressed image data into the image data before it is compressed, viz., the original image data.

The page buffer 6 is provided for temporarily storing the image data of several pages of the original document. The page buffer 6 temporarily stores data to be written into the disk 7 and data read out of the disk 7. Further, the page buffer 6 temporarily stores image data to be output, not storing into the disk 7. The stored image data is subjected to the editing process such as rewriting or replacement.

The disk 7 of a large memory capacity is used for storing a large amount of compressed image data. The operation of writing data into and reading it out of the disk 7 is controlled by a disk controller 7a.

The data to be stored into the disk 7 includes two- or multi-level image data and code data. The code data is stored into the disk 7, through a route of the image bus 10, the multiplexer 3 and the compressor 4. In this case, the compressor 4 is placed to the through mode. This mode is also used when the image data input to the compressor 4 is stored into the page buffer 6 as it is or directly output, omitting the compression process by the compressor 4 and the expansion process by the expander 5.

The control circuit 2 exchanges data with other components of the multifunctional image recording system and synthetically controls the components in the image processing system 1. The control circuit 2 includes a ROM (read only memory) which stores image data for diagnosis (diagnosis data) and reference data for test that is formed by expanding and properly processing the diagnosis data and compressing the same again.

Next, the self-diagnosis operation of the multifunctional image recording system shown in FIG. 1 will be described with reference to the flowchart of FIG. 2.

An instruction to start the self-diagnosis of the rotation processor 22 is entered (step 101). To carry out the self-diagnosis, the control circuit 2 secures a memory area of two pages in the page buffer 6, and reads the compressed specific image data from the ROM thereof and directly depicts it in the first page area of the page buffer 6 (step 102).

Then, in order to restore the compressed specific image data to the diagnosis image data, the control circuit 2 sets the expander 5 to expand the specific image data, and to develop the expanded data in the second page of the page buffer 6, and starts up the expander 5 (step 103). As a result, the diagnosis image data is restored in the second page area of the page buffer 6 (step 104).

Next, to carry out a process of rotating the restored specific image data for diagnosis, the control circuit 2 sets the rotation processor 22 to develop the result of the image rotation into the first page area of the buffer, sets the instructions of a rotation angle to be diagnosed and others in the rotation processor 22, and starts up the rotation processor 22 (step 105). The rotation processor 22 carries out the image rotation process (step 106).

Next, to compress the rotated specific image data for diagnosis, the control circuit 2 sets the compressor 4 to compress the rotated specific image data and develop the compressed data into the memory area of the first page, and starts up the compressor 4 (step 107). As a result, the image data for diagnosis is stored in a compressed form in the first page area of the page buffer 6 (step 108).

Finally, the control circuit 2 checks whether or not the rotated and compressed image data is the same as the expected test image. To this end, the control circuit 2 successively reads the rotated and compressed image data for diagnosis from the first page area of the page buffer 6, and compares the readout diagnosis image data with the compressed test image from the ROM in a compressed form (step 109). When the comparison for the final pixels is completed (step 110) and it is found that the compressed image data and the test image data are exactly the same, it is decided that the rotation processor 22 is normal (step 111). When the compressed image data is not the same as the test image data, it is decided that the rotation processor 22 is abnormal (step 112).

In this way, the image processing system can efficiently diagnose the rotation processor 22, by itself. Accordingly, the resultant image processing system is inexpensive.

Next, another embodiment of the image processing system according to the present invention will be described. The hardware arrangement of the second embodiment is the same as that of the first embodiment of FIG. 1 except that the ROM of the control circuit 2 stores the compressed diagnosis data and test data. The test data is formed in a manner that the diagnosis data is expanded, properly processed, and compressed. The compressed data items are then summed together.

The self-diagnosis operation of the multifunctional image recording system according to the second embodiment of the present invention will be described with reference to a flowchart of FIG. 3.

An instruction to start the self-diagnosis of the rotation processor 22 is entered (step 201). To carry out the self-diagnosis, the control circuit 2 secures a memory area of two pages in the page buffer 6, and reads the compressed specific image data, i.e, the image data in the form of a compressed form, from the ROM thereof and directly depicts it in the first page area of the page buffer 6 (step 202).

Then, in order to restore the compressed specific image data to the diagnosis image data, the control circuit 2 sets the expander 5 to expand the specific image data, and to develop the expanded data in the second page of the page buffer 6, and starts up the expander 5 (step 203). As a result, the diagnosis image data is restored in the second page area of the page buffer 6 (step 204).

Next, to carry out a process of rotating the restored specific image data for diagnosis, the control circuit 2 sets the rotation processor 22 to develop the result of the image rotation into the first page area of the buffer, sets the instructions of a rotation angle to be diagnosed and others in the rotation processor 22, and starts up the rotation processor 22 (step 205). The rotation processor 22 carries out the image rotation process (step 206).

Next, to compress the rotated specific image data for diagnosis, the control circuit 2 sets the compressor 4 to compress the rotated specific image data and develop the compressed data into the memory area of the first page, and starts up the compressor 4 (step 207). As a result, the image data for diagnosis is stored in a compressed form in the first page area of the page buffer 6 (step 208).

Finally, the control circuit 2 checks whether or not the rotated and compressed image data is the same as the expected test image. To this end, the control circuit 2 successively reads the rotated and compressed diagnosis image data in the form of numerical values from every storage section from the first page area of the page buffer 6, calculates the sum of data in every storage section (step 209), of the first page area of the page buffer and compares the calculated sum total data with the sum total data for every storage section of the test data that is read out of the ROM (step 210). When the comparison for the final storage section is completed (step 211) and it is found that both the calculated sum total data and the stored sum total data are exactly the same, it is decided that the rotation processor 22 is normal (step 212). When they are not the same, it is decided that the rotation processor 22 is abnormal (step 213).

As described above, the amount of the image data statically retained in the image processing system can be reduced. Accordingly, the cost to manufacture the image processing system is reduced. Further, the data amount required for developing the diagnosis data and for testing the processed data is reduced. This leads to high speed diagnosis processing.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing system comprising:

storing means for storing image data and compressed data;

compressing means for compressing the image data stored in said storing means and storing the compressed image data into said storing means;

expanding means for expanding the compressed image data stored in said storing means and storing the expanded image data into said storing means;

diagnosis data storing means for storing predetermined diagnosis data in a compressed form;

developing means for reading out the diagnosis data from said diagnosis data storing means and storing the readout diagnosis data into said storing means;

test data storing means for storing compressed test data formed by previously processing uncompressed diagnosis data and then compressing the processed uncompressed diagnosis data; and comparing means for comparing the test data from said test data storing means with the compressed data from said storing means, wherein the diagnosis data of the compressed form that is developed into said storing means is restored to its original form by said expanding means, the restored dats is processed by said image processing means, and the processed data is compressed by said compressing means and then compared with the compressed test data by said comparing means.

2. The image processing system according to claim 1, wherein the memory area of said storing means is divided into at least a first and a second area, said first and second areas being alternately used for expansion, processing, and compression.

3. The image processing system according to claim 1, wherein said image processing means includes means for rotating image data.

4. An image processing system comprising:

storing means for storing image data and compressed data;

compressing means for compressing the image data stored in said storing means and storing the compressed image data into said storing means;

expanding means for expanding the compressed image data stored in said storing means and storing the expanded image data into said storing means;

image processing means for processing the image data stored in said storing means and storing the processed image data into said storing means;

diagnosis data storing means for storing predetermined diagnosis data in a compressed form;

developing means for reading out the diagnosis data from said diagnosis data storing means and storing the readout diagnosis data into said storing means;

sum total calculating means for reading data from said storing means in the form of numerical values and for summing the readout data of numerical values;

sum total data storing means for storing the sum total of test data formed by summing the numerical values of the test data, said test data being previously formed by processing uncompressed diagnosis data and then compressing the processed diagnosis data; and comparing means for comparing the sum total of the test data with the sum of the data calculated by said sum total calculating means, wherein the diagnosis data of the compressed form that is stored into said storing means by said developing means is restored to its original form by said expanding means, the restored data is processed by said image processing means, the processed data is compressed by said compressing means, and the sum total of the compressed data output from said compressing means is calculated by said sum total calculating means, and the sum total thus obtained is compared by said comparing means with the sum total data read out of said sum total data storing means whereby the operation of said image processing means is diagnosed.

5. The image processing system according to claim 4, wherein the memory area of said storing means is divided into at least a first and a second area, said first and second areas being alternately used for expansion, processing, and compression.

6. The image processing system according to claim 4, wherein said image processing means includes means for rotating image data.

7. A method of diagnosing an image processing system comprising the steps of:

storing predetermined diagnosis data of a compressed form into a first page of storing means capable of storing image data of at least the first page and a second page;

expanding the diagnosis data of the compressed form read out of said first page into restored diagnosis image data, and storing the restored diagnosis image data into the second page of said storing means;

processing the restored diagnosis image data and storing the processed diagnosis image data into the first page of said storing means;

compressing the processed diagnosis image data read out of said first page memory area and storing the compressed diagnosis image data into the second page of said storing means; and diagnosing the result of processing the restored diagnosis image data by comparing the compressed diagnosis image data read out of the second page of said storage means with previously stored compressed test data.

* * * * *

UNITED STATES PATENT AND TRADEMARK OFFICE
CERTIFICATE OF CORRECTION

PATENT NO. : 5,526,137
DATED : June 11, 1996
INVENTOR(S) : Yu NAMEKI

It is certified that error appears in the above-indentified patent and that said Letters Patent is hereby corrected as shown below:

Claim 1, column 7, line 53, "dats" should read --data--.

Signed and Sealed this

Nineteenth Day of November, 1996

Attest:

BRUCE LEHMAN

*Attesting Officer*  *Commissioner of Patents and Trademarks*